Oct. 5, 1965

H. R. THIEME 3,209,656

CONTROLLING APPARATUS

Filed July 16, 1962

INVENTOR.
HORST R. THIEME

BY *Arthur H. Swanson*

ATTORNEY.

FIG. 2

INVENTOR.
HORST R. THIEME
BY Arthur H. Swanson
ATTORNEY.

Oct. 5, 1965  H. R. THIEME  3,209,656
CONTROLLING APPARATUS
Filed July 16, 1962  4 Sheets-Sheet 3

*INVENTOR.*
HORST R. THIEME
BY *Arthur H. Swanson*
ATTORNEY.

INVENTOR.
HORST R. THIEME
ATTORNEY.

United States Patent Office 3,209,656
Patented Oct. 5, 1965

3,209,656
CONTROLLING APPARATUS
Horst R. Thieme, Ardsley, Pa., assignor to Honeywell Inc., a corporation of Delaware
Filed July 16, 1962, Ser. No. 210,624
14 Claims. (Cl. 91—359)

It is an object of the present invention to disclose a positioning apparatus which is constructed to more rapidly displace a movable member, e.g. the stem and plug of a control valve in a flowline, between any one of a number of preselected positions with greater precision than has heretofore been possible with presently available positioners.

Positioners which have heretofore been employed have not been satisfactory for applications where rapid, precise positioning of a valve stem and plug are required because a continuous fixed amount of a regulated air supply under pressure must be bled to atmospheric pressure from a pilot valve, which forms an integral part of these positioners.

Experimentation has shown that while a load is being applied in an upward and downward direction on the plug and stem of a control valve by a fluid passing through this valve and the aforementioned conventional fixed bleed type pilot valve is sending an output fluid pressure signal to the control valve to force the valve stem and plug to its final control position, an undesired amount of drift will be experienced by the control valve stem and plug while the positioner is moving the stem to this desired final control valve position.

It is thus another object of the present invention to disclose a unique positioner having a pilot valve which is not required to be continuously bled to atmosphere and which will reduce the aforementioned drift to a completely satisfactory level so that a valve stem and plug associated with this positioner can be moved in a rapid, precise manner to any one of a number of desired final control positions.

More specifically, it is still another object of the present invention to provide a positioner which has an adjustable spring-loaded flapper and an associated atmospheric exhaust nozzle for its pilot valve, whose flapper can be initially adjusted to completely close the atmospheric exhaust port under certain conditions, for example, the condition during the aforementioned initial over-shooting movement of the stem, when slight costly exhaust bleeding to atmosphere from this actuator is not necessary, and at the same time is able to cause a slight bleed to atmosphere to occur during all other operating conditions, thereby obtaining the high sensitivity that is desired under these latter operating conditions.

Still another object of the invention is to provide an adjustable spring-loaded flapper for a fluid supply pressure nozzle in the aforementioned pilot valve which flapper is jointly connected for movement by means of a movable stem with the previously-referred-to flapper of the exhaust flapper-nozzle unit, so that more economic use of the supply air under pressure can be made use of by the pilot valve than has heretofore been possible when continuous bleed to atmospheric type pilot valves have been used.

Presently-available positioners have been required to use a first pilot valve and cam feedback linkage structures when employed for use as a direct-acting positioner, and still another different pilot valve and cam linkage structures when they are employed as a reverse-acting positioner.

It is thus another object of the invention to disclose a single pilot valve and single cam which, when fixedly mounted in one position, will enable the positioner disclosed herein to be used as a top-loaded, direct-acting positioner, or a bottom-loaded, reverse-acting positioner and, when fixedly mounted in another different position, will enable the positioner to be used as a top-loaded, reverse-acting positioner or a bottom-loaded, direct-acting positioner.

Another more specific object of the present invention is to disclose a single, spring-loaded, dual exhaust and supply nozzle unit for a pilot valve of a valve positioner which, when rotated one hundred eighty degrees with respect to atmospheric exhaust and supply pressure passageways in the body of the positioner, will enable one of these nozzles, which in its previous position was acting as an atmospheric exhaust nozzle, to then become an air pressure supply nozzle and the other of these nozzles, which in its previous position was acting as an air supply nozzle, to simultaneously become an atmospheric exhaust nozzle.

A still further object of the invention is to provide a direct acting or a reverse-acting positioner of the aforementioned type in which no supply air under pressure will be consumed or lost to atmospheric pressure when a zero output or full output to control valve condition is prevalent and in which a preselected, independently adjustable amount of supply air under pressure will enter the pilot valve and be exhausted therefrom only during the time a balanced valve positioned condition is prevalent.

Another object of the invention is to provide a positioner of the aforementioned type having a supply and atmospheric exhaust flapper nozzle valve whose valve overlap can be adjusted to provide a high degree of sensitivity, or a low dead band, good reproducibility, and one which will at the same time require an abnormally small amount of air from a regulated fluid pressure supply source to make it operable.

Another important object of the present invention is to disclose a unique single feedback cam structure for the aforementioned positioning apparatus which will enable a control valve member, which the positioning apparatus is employed to actuate, to be fixed at any stroke which lies within one or another of two stroke length ranges when the positioner is either in a direct-acting position or a reverse-acting position.

Still another object of the invention is to provide a single valve positioner that is readily adaptable for use in actuating different size control valves.

FIGS. 11–13 also indicate in sequence the three different positions that the flapper-nozzles will be in during (a) a balanced fluid-pressure condition, (b) a zero fluid-pressure output condition and (c) a full fluid-pressure output condition when the positioner has been placed in the reverse-acting position shown in FIG. 5.

Figures 1, 6:
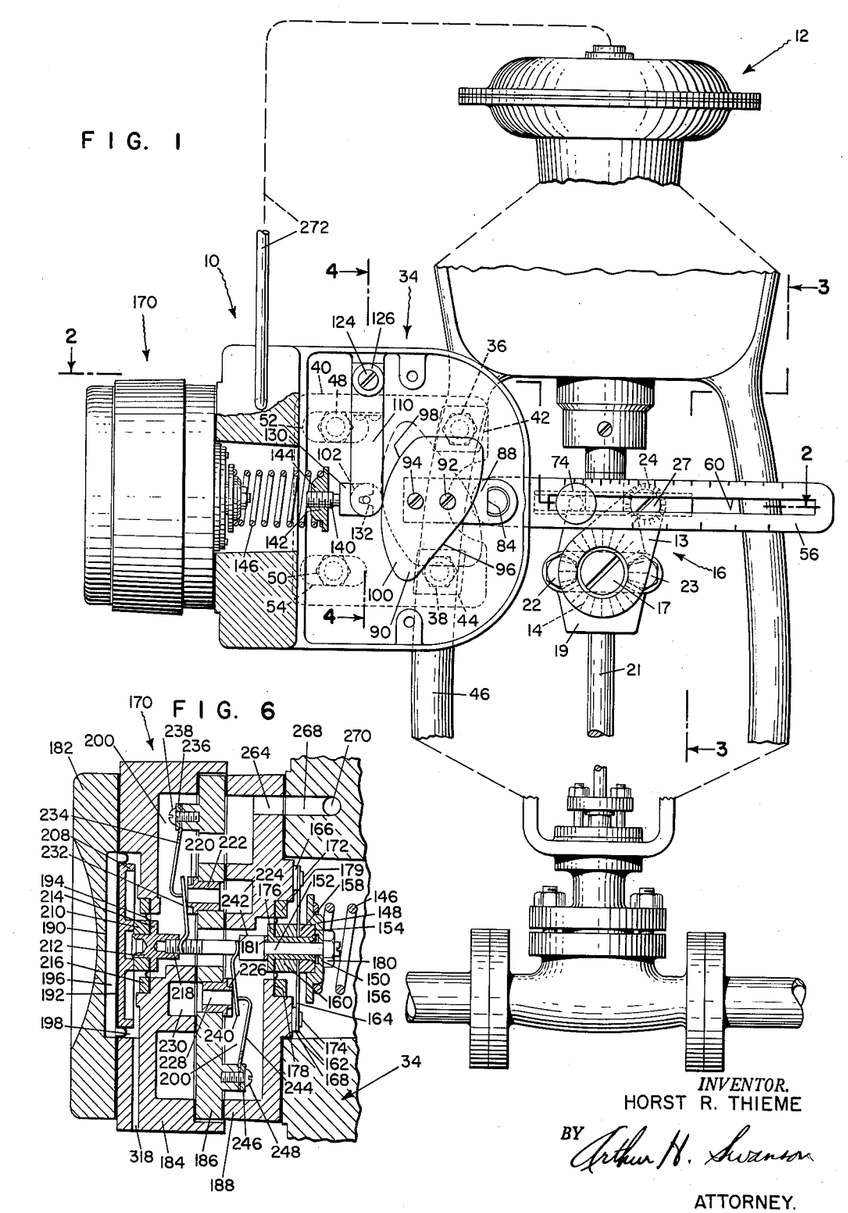
FIG. 1 shows a side elevation view of how the positioner disclosed herein is side-mounted on a yoke of a control valve.
FIG. 6 is a sectional view of the positioner taken along the line 6—6 of FIG. 5.

FIG. 1 of the drawing shows how the positioner 10 disclosed herein can be used with a fluid pressure actuated member, such as a well-known, fluid pressure actuated, spring loaded, diaphragm type control valve 12.

Figure 2:
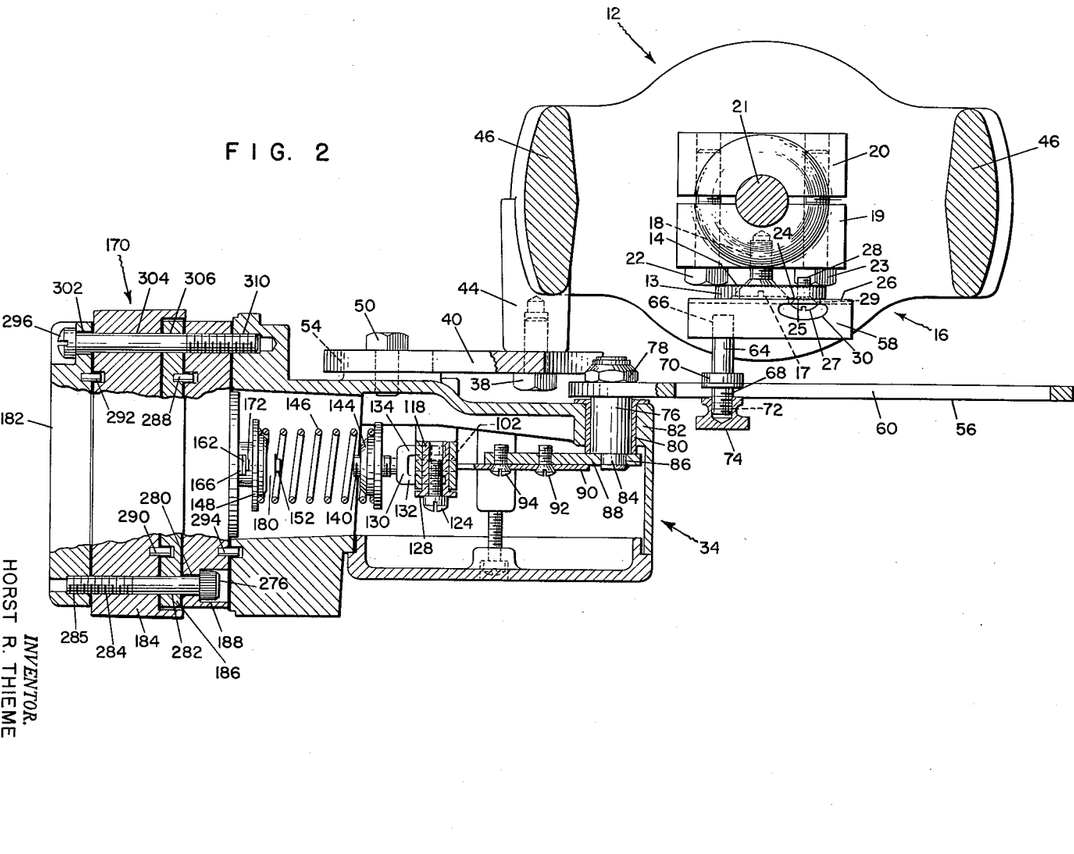
FIG. 2 is a cross-sectional view taken through the section line 2—2 of FIG. 1.
Figure 3:
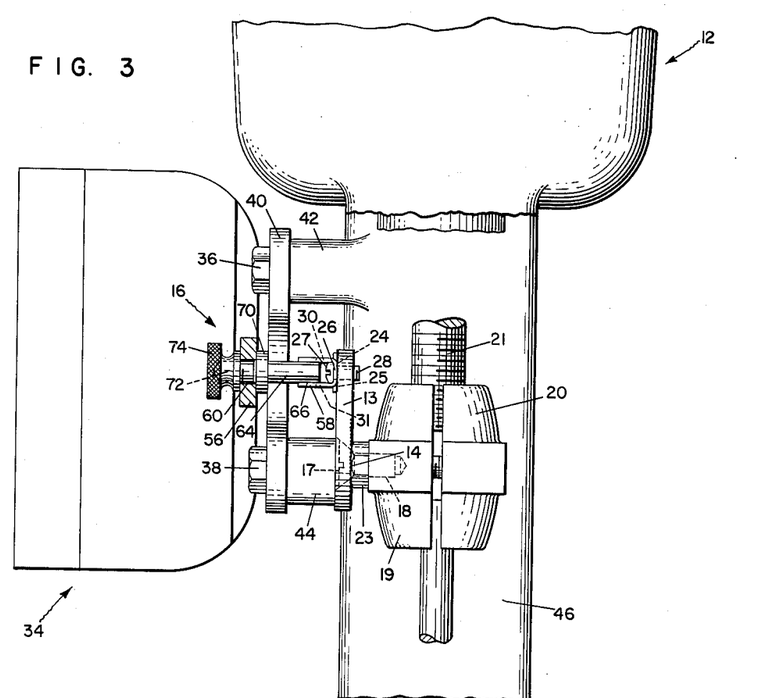
FIG. 3 is a partial cross-sectional view taken along the section line 3—3 of FIG. 1.

As is shown in FIGS. 1–3 of the drawing, an arm 13, having a radially grooved out back friction surface 14 forming a part of a feedback linkage 16, is shown fixedly mounted by means of a flat head screw 17 and associated threads forming a tapped wall portion 18 in a first one of two clamping blocks 19, 20. These clamping blocks 19, 20 are retained in tight rigid engagement with the control valve stem 21 by means of tap bolts 22, 23, as is best shown in FIGS. 1 and 3. When the screw 17 tightens the arm 13 in the angular position desired, its grooved out friction surface 14 will be brought into friction contact with the flat heads of the bolts 22, 23. Such a connection thus affords a way of retaining the arm 13 in a number of different fixed angular positions with respect to the stem 21 of the control valve 12.

FIGS. 1–3 of the drawing also show the front end surface of the arm 13 as having a radially knurled surface 24 against which a radially knurled surface 25 on the base of a plate 26, which is shown bent into the form of a channel, can be frictionally engaged. The arm 13 and plate 26 are held together by means of a truss head machine screw 27 when tightened as shown with the threads 28 formed by an aperture wall in the arm 13.

Before the plate 26 is bent into the channel shown, a bored out apertured wall 29 and two slotted out wall portions 30, 31 are formed therein. The screw 27 is then passed through the apertured wall 29 and the side parts of the plate are then bent into the channel shape configuration shown in the drawing.

If the screw 27 starts to unthread itself from the threads 24 after it has been tightened, the head of this screw 27 will then engage the channel wall 29, 30 forming the slotted out side wall portions and this will prevent the screw 27 from becoming disengaged any further from the threads 24. The arm 13 and channel 26 thus form a link in the feedback linkage 16.

FIGS. 1–3 also show how a positioner housing 34 which surrounds a portion of this feedback linkage 16 is fixedly mounted by means of a pair of tap bolts 36, 38 passing through the right end of a support plate 40 into threaded engagement at e.g. on embossed portions 42, 44, of yoke 46 of the control valve 12 and fixedly mounted by means of two tap bolts 48, 50 on the positioner housing 34.

The support plate 40 is shown having elongated slots therein formed by the wall surfaces 52, 54 to afford easy alignment of these bolts 48, 50 with their associated threaded connections in the afore-mentioned embossed portion when the positioner is mounted on control valves having different size yokes than that shown.

FIG. 2 of the drawing shows link 56 positioned in parallel relation with the link 26 which is in the form of a channel. Each of links are shown having wall portions 58, 60 which form two aligned slots.

Extending between the first and second links 26, 56 and in slidable contact with the walls 58, 60 there is shown a connecting pin 64. The outer cylindrical surfaces 66, 68 of this pin 64 are shown in sliding engagement with the surfaces 58, 60. This pin 64 is also shown in FIG. 2 provided with a shoulder 70 which is of a dimension that is larger than the slot formed by the inner slotted surface 60 of the link 56. The front end of the pin 64 is threaded at 72 to accommodate the mounting of an internally threaded knurled cap 74 thereon.

The left end of the second link 56 is shown surrounding the rear end of a pivot shaft 76 and being fixedly mounted by means of a nut 78 thereon. This pivot shaft 76 in turn is shown mounted for rotation by the second link in a sleeve bearing 80 which is turn is forced fitted into a wall 82 forming an aperture in the positioner housing 34.

The outer end of the pivot shaft 76 has a flat key edge 84 that is forced into a similar wall surface 86 of a support plate 88.

A cam 90 is shown mounted by means of screw connections 92, 94 on the left end of the support plate 88.

It can be seen that the right and left edges 96, 98 of the cam 90 are of a different shape.

When the cam 90 is mounted in the solid line position, and the arrow 100 is pointing in the same downward direction that the stem 21 is moved when it closes the control valve 12, the cam will then be in its direct acting or D.A. position for use with a control valve that has any selected stroke length that is within a first valve stroke range.

If the screws 92, 94 are removed and the cam 90 is flipped and remounted as shown on the plate 88 in the dotted line or reverse acting position it can then be used in this position with a control valve that has the previously mentioned selected stroke length that is within the first valve stroke range.

The specific stroke selected for the control valve 12 is accomplished by adjusting the previously-mentioned feedback linkage 16 and valve stem connection 17 associated with the linkage.

It is not only possible with the cam construction shown in FIG. 1 to use this cam in either of the direct acting D.A. or reverse acting R.A. positions referred to above but also possible to remove the connecting screws 92, 94 and rotate the cam one hundred eighty degrees from either one of the positions shown. When the cam 90 is then mounted on plate 88 and in either of these rotated positions the cam will in each instance then be made use of in the positioner having second valve stroke range that is different from the previously mentioned first valve stroke range.

The upper and lower front surfaces of the link 56 are shown having the aforementioned different stroke length range scales inscribed thereon. Selection of any individual stroke on either of these scales can be obtained by sliding the pin 64 along the slot 60 to the desired stroke indicated on the aforementioned scales and then locking the pin 64 in place by means of the knurled cap 74.

From the aforementioned description, it can be seen that the cam 90 is capable of being placed in any one of four different positions so that different lengths of stroke of a control valve 12 are provided when the positioner disclosed herein is required to act either as a direct acting or reverse acting type of positioner.

Figure 4:
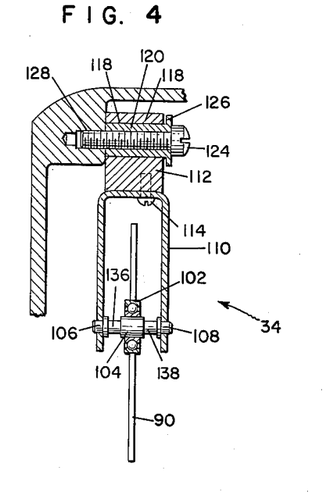
FIG. 4 is a cross-sectional view taken through line 4—4 of FIG. 1.

FIGS. 1, 2 and 4 of the drawing show the outer peripheral surface of a ball bearing 102 in contact with a peripheral surface of the cam 90. This ball bearing 102 acts as a cam follower which, as hereinafter described in detail, will be moved along a first active common peripheral length of the cam's peripheral surface 98 when the cam is positioned in one direct acting or reverse acting first control valve stroke range position and the cam follower will be moved along a second common peripheral surface 96 that is the same as the first active cam surface length 98 when the cam is positioned in a second direct acting or reverse acting second control valve stroke range position.

FIG. 4 shows the inner diametrical surface of bearing 102 fixedly mounted on a shaft 104 which in turn has end portions 106, 108 mounted in a U-shaped clevis arm 110, that is made of any suitable spring material. The top of the clevis arm 110 is fixedly mounted to a clevis block 112 by means of the screw connections 114, 116. The upper portion of the clevis block 112 is shown having a cylindrical wall surface 118 that forms an aperture therein.

A cylindrical sleeve bearing 120 is shown located within the cylindrical-shaped wall surface 118 for rotatable contact therewith.

The left end 122 of the bearing 120 is held in tight surface to surface contact with an inner surface of the positioner housing 34. This is accomplished by means of a cap screw 124 whose head portion is in contact with the right cylindrical end 126 of the bearing and whose other end is threadedly connected at 128, with the surfaces forming a tapped hole in the housing 34.

It should be noted that when the parts of the clevis are assembled that there is a small clearance between the under side surface of the right end portion 126 of the bearing 120 and the right end of the clevis block 112 to thereby allow a rocking movement to take place between the clevis block 118, arm 110, shaft 108, bearing 102 and the cylindrical surface of the bearing 120 on which the block 112 and the other parts are mounted.

As is best shown in FIGS. 1 and 2, a clevis 130 having two V-shaped members 132, 134 which form its fork are respectively engaged with the cylindrically-shaped coil spring adjusting member 142, which in turn is provided with embossed portion 144 for retaining one end of the coil spring 146 thereon.

FIG. 6 shows the left end of the spring 146 retained on an embossed cylindrical member 148. The member 148 in turn is provided with an aperture wall 150 in the central wall end portion thereof which surrounds the right end of the connecting rod 152. The left end surface of a member 148 is shown in surface contact with a first spacer sleeve 154 which is mounted on the periphery of sleeve 156.

A spider-shaped centering spring 158 which is of a well-known commercially available construction is shown positioned about the sleeve 156 between the first spacer 154 and a second spacer 160 which is also mounted on the sleeve 156.

The centering spring 158 has three angularly spaced displaced arms, for example 162, 164 extending out from a central portion. The ends of these arms are mounted on embossed portions 166, 168 of the right end of pilot valve housing 170. Suitable connecting means such as the screws 172, 174 are shown retaining the outer ends of the centering spring arms in fixed relation with the right end of the housing 170.

The left end of the sleeve 156 has a cylindrical flange 176 whose right wall surface abuts a diaphragm 178 and presses a central portion of this diaphragm into fluid tight engagement with the left end of the spacer 160 when the right end of sleeve 156 is flared as shown on spacer 154.

A ring 179 is press fitted and staked into pilot valve casing part 170 as shown to retain the periphery of diaphragm 178 in fluid tight engagement with this casing part 170.

When the nut 180 that is threadedly mounted on the right end of the connecting rod 152 is tightened the gasket 181 will be compressed to the position shown to form a fluid tight seal when the screw threaded connection 218 has been adjusted to the desired position to change the overlap of the flappers 232, 240.

The pilot valve casing 170 is comprised of, as is best shown in FIG. 6, four parts 182, 184, 186, 188 which together with the wall 190 and diaphragms 192, 194 and 178 form a first chamber 196, a second chamber 198 and a third chamber 200.

Figure 5:
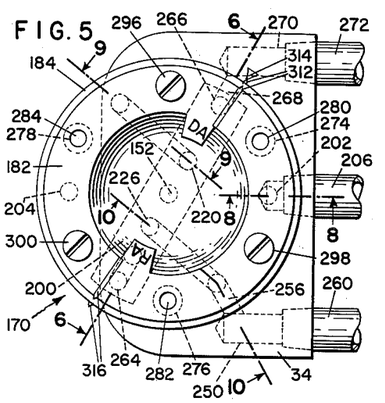
FIG. 5 is a left end elevational view of FIG. 1 showing the position of the fluid passageways in this end of the positioner when the positioner is in a direct-acting position.
Figure 7:
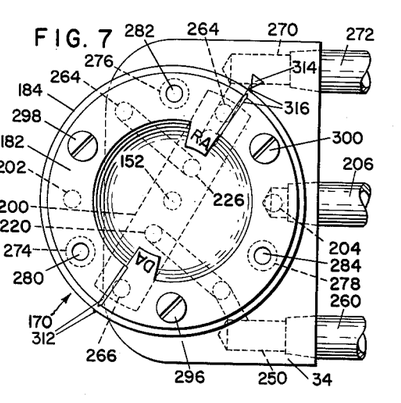
FIG. 7 is a view of the left end of the positioner which is similar to that shown in FIG. 5, but which differs from FIG. 5 in that the pilot valve is shown rotatably displaced one hundred eighty degrees from that shown in FIG. 5 to thereby enable the positioner to be placed in a reverse-acting position.
Figure 8:
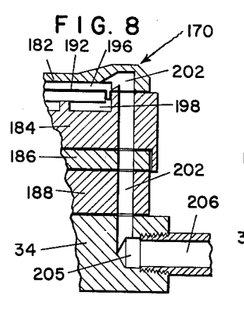
FIG. 8 is a sectional view taken along the section line 8—8 of FIG. 5.

As is best shown in FIGS. 5, 7, and 8, the first chamber 196 has two identical passageways 202, 204 passing vertically through the side walls 182, 184, 186, 188 of the pilot valve 170. When the valve positioner is placed in a direct acting D.A. position, as shown in FIGS. 5 and 6, the passageway 202 will be connected by way of the L-shaped passageway 205, and connecting passageway 206 to a fluid pressure signal whose magnitude varies in accordance with changes in the magnitude of a variable under measurement. This pressure signal can for example be a pneumatic signal being sent from a control instrument, not shown, to the pilot valve.

When the pilot valve 170 is rotated to the reverse acting position shown in FIG. 7, the passageway 204, which in the previously-mentioned D.A. position had been dead-ended against the top of the casing 124, will now be connected in the same manner to passageway 206 that passageway 202 was connected when in the D.A. position.

The lower surface of the diaphragm 192 has a plate 208 connected thereto which, in turn, is in contact with a cylindrical plate 210 which in turn is shown peened into position on a cylindrical hub portion 212. The flange 214 on hub portion 212 together with the peened-in-place cylindrical plate 210 form a fluid tight joint with the central portion of the diaphragm 194. The peripheral portion of the diaphragm 194 is retained in fluid tight contact with the part 184 of the pilot valve casing 170 by means of a ring-shaped member 216 that is press fitted and staked into a portion of the casing part 184 as shown in FIG. 6.

The left, inner end of the hub portion 212 contains screw threads at 218 for threadedly adjusting the threaded left end of the connecting rod 152 therein when the effective length of the rod is desired to be moved to a different position than that shown.

FIG. 6 shows a regulated air supply nozzle 220 fixedly mounted in casing 186 and having an unrestricted air passageway 222 whose left end opens into the left portion of the third chamber 200 and whose right end opens into a connecting passageway 224.

FIG. 6 shows a second exhaust nozzle 226 fixedly mounted in casing 186 and having an unrestricted passageway 228 whose right end opens into the right portion of the third chamber 200 and whose left end opens into a connecting passageway 230.

The air supply nozzle 220 is provided with a flapper 232 that has one end pivoted on the outer edge thereof and its other end adjustably fixed for pivoted movement at one end of the hub portion 212 that is attached to the connecting rod 152. The other end of the flapper 232 is shown held in a partially open or balanced position. A curved leaf spring 234 is fixedly connected by means of a screw and washer connection 236, 238 and is shown retaining the flapper in the aforementioned balanced position.

The atmospheric exhaust type bleed nozzle 226 is also provided with a flapper 240 that has one end pivoted on the outer edge thereof and its inner end adjustably fixed for pivoted movement at the left end of the hub portion 242 that is attached to the connecting rod 152. The other end of the flapper 240 is shown held in a partially open or balanced position. A leaf spring 244 that is fixedly connected by means of a screw and washer connection 246, 248 is shown retaining the flapper in the aforementioned balanced position.

Figure 9:
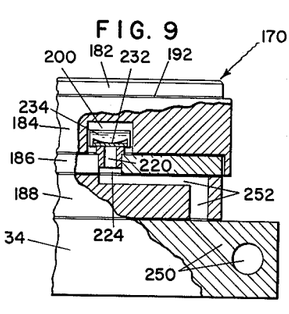
FIG. 9 is a sectional view taken along the line 9—9 of FIG. 5.

When the valve positioner is placed in a direct acting D.A. position as shown in FIGS. 5 and 6, the fluid supply passageway 250 in the positioning casing 34 that is shown in FIG. 9 will be open to atmospheric pressure at one of its ends by way of the flapper nozzle valve 220, 232.

An L-shaped passageway 252 in the pilot valve casing part 188 is employed to connect the nozzle 20 and passageway 224 connected thereto with a fluid supply passageway 250 which is connected to a regulated air supply pressure source, not shown.

Figure 10:
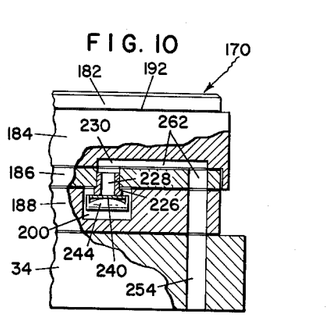
FIG. 10 is a sectional view taken along the section line 10—10 of FIG. 5.

Furthermore, when the valve positioner is in the direct acting position D.A., as shown in FIGS. 5 and 6, the exhaust passageway 254 in the positioner casing 34 that is shown in FIG. 10 will be connected by way of connecting passageways 256, 250, 260 at its lower end.

An L-shaped fluid pressure exhaut passageway 262 in the pilot valve casing parts 184, 186 is employed to connect the nozzle 226 and passageway 230 connected thereto with the exhaust passageways 254.

In FIGS. 5 and 6 there is shown spaced apart passageways 264 and opening into the third chamber 200 at one of their ends, as shown, and connected by way of the connecting passageways 268, 270, 272 to the top of the control valve 12 when one or the other of the passageways 264 or 266 are aligned with the previously-mentioned passageways 264 or 266.

It should be understood that the pilot valve 170 can be placed in a direct acting D.A. position and the cam 90 can be flipped from its direct acting D.A. position and a bottom loading connection made by means of passageway 272 with the control valve in lieu of the top loading connection shown in FIG. 1 to thereby obtain a direct acting positioner with a reverse acting actuator.

It should also be understood that the pilot valve 170 can be placed in a reverse acting R.A. position and cam 90 can be flipped from its reverse acting position and a bottom loading connection made in the same manner as that noted supra with the control valve 12 to thereby maintain a reverse acting positioner with a reverse acting actuator.

FIGS. 2 and 5 of the drawing show how three cap screws 274, 276, 278 which are spaced 120 degrees apart from one another pass through for example apertured wall portion 280, 282, 284 formed in the pilot valve casing parts 188, 186, 184 and are threadedly connected at 286 to a remaining casing part 182.

FIG. 2 also show how a suitable number of pin and cylindrical slot connections 288, 290, 292 are employed to align the pilot valve casing parts 182–188 in their correctly assembled position before the three cap screws 274–278 are used to join these parts together as a single unit 170.

Another pin and cylindrical slot connection 294 is employed between the pilot valve casing part 188 and the positioner casing 34 so that the pilot valve unit 170 is brought into correct assembled position with the positioner casing 34.

When the pilot valve unit 170 and positioner casing 34 are aligned in the aforementioned manner three additional cap screws 296, 298, 300 as shown in FIG. 5 can be assembled in, for example the manner shown in FIG. 2 for the cap screw 296.

It can thus be seen in FIG. 2 that apertured wall portions 302, 304, 306 are formed in the pilot valve casing parts 182, 184, 186 to accommodate, e.g. the passage of the cap screw 296 therethrough and into threaded engagement with a tapped out, threaded wall portion 310 formed in the positioner casing 34.

When the pilot valve unit 170 is connected to the fixedly mounted casing of the positioner 34 by means of the three screws 296, 298, 300 in the direct acting position, shown in FIG. 5, the letters D.A. will appear at the top of the upper surface of the casing 182. When the pilot valve unit 170 is correctly placed in the previously-referred-to direct acting D.A. position, as shown in FIG. 5, a first raised indicating edge 312 of an inverted broken L-shaped configuration will extend in a radial direction along the top of the casing 182 and in a downward direction, as shown on the outer peripheral portion of the pilot valve casing parts 182–188, and will be aligned with a triangular-shaped indicating mark 314 shown on the top of the positioner casing 34.

When the pilot valve unit 170 is then rotated one hundred and eighty degrees and connected to the fixedly mounted casing of the positioner 134 in the reverse acting position, shown in FIG. 7 by means of the three cap screws 296, 298, 300 the letters R.A. will appear on the top of the upper surface of the casing 182.

When the pilot valve unit 170 is correctly placed in the previously-referred-to R.A. position as shown in FIG. 7, a second raised indicating edge 316 of a broken inverted L-shaped configuration will extend in a radial direction along the top of the casing 182 and in a downward direction as shown on the outer periphery of the pilot valve casing parts 182–188 and will be aligned with the raised triangular-shaped indicating mark 314 shown on the top of the positioner casing 34.

When the pilot valve 170 is rotated from a direct acting D.A. position to the aforementioned reverse acting R.A. position, it can be seen that the following changes will occur:

(A) The first chamber 196 containing the control fluid pressure will then be connected by way of passageway 204 to the L-shaped passageways 205, 206 in lieu of by way of the former D.A. passageway 202 connection.

(B) The second chamber 198 will remain connected to atmospheric pressure by way of an unrestricted passageway 318 in casing part 184 so that the diaphragms 192, 194 will each have this atmospheric pressure applied to an active side surface portion.

(C) The third chamber 200 will be supplied with a regulated air supply by way of the passageway 250, the L-shaped passageway 262, passageway 230 and the previously-referred-to atmospheric bleed nozzle flapper valve 226, 240.

(D) The fluid pressure in the third chamber 200 will also be exhausted by way of the previously-referred-to fluid supply nozzle flapper valves 220, 232.

When the pilot valve is positioned in the direct acting (D.A.) position noted supra, it can be seen that a balanced positioner-control valve condition will be prevalent. When such a balanced condition is present, the control fluid pressure will be applying a force by way of the diaphragm 192 to the left end of the connecting rod 152 which is of a magnitude that is equal to the magnitude of force being applied in an opposite direction to the right end of the rod 152 by the spring 146 of feedback linkage 16.

The force applied by the spring 146 to the right end of the connecting rod 152 under any balanced condition will be determined by the magnitude of the fluid pressure being applied to the third chamber 200, passageway 268, 270, 272 and the control valve 12 which, in turn, will cause the control valve stem 28 to transmit a force to the spring 146 by way of the feedback linkage 16.

Figure 11:
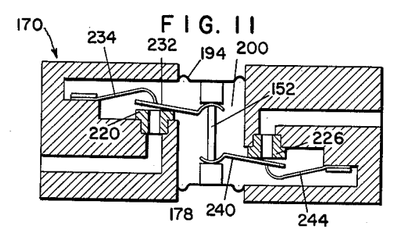
FIGS. 11–13 are schematic diagrams which show three flapper-nozzle positions that the pilot valve of FIG. 6 will take during (A) a balanced fluid-pressure condition, (B) a full fluid-pressure output condition and (C) a zero fluid-pressure output condition when the positioner has been placed in the direct-acting position shown in FIG. 5.

The aforementioned dual, partially open, supply-exhaust flapper-nozzle which is present when a balanced condition prevails is shown in FIGS. 6 and 11.

Figure 12:
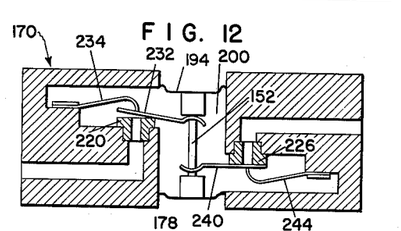

FIG. 12 schematically shows the position of the flappers 232, 240 when a full output fluid pressure condition or a condition in which no regulated supply of air under pressure is consumed nor bled to atmospheric pressure through the exhaust nozzle 226 when the pilot valve 170 has been placed in its direct acting D.A. position.

When the pilot valve 170 shown in FIG. 12 has been rotated one hundred and eighty degrees, as previously described, to a reverse acting position from that shown in FIG. 12, it can be seen that the flapper nozzle 240, 226 which is then connected to the regulated fluid pressure supply, not shown, will be closed and that the air under pressure in the third chamber 200 is exhausted to atmospheric pressure by way of the then exhaust flapper nozzle valves 220, 232. Under this reverse acting R.A. condition the pilot valve 170 will not be consuming any air from the aforementioned regulated air supply source nor applying any of the regulated supply pressure to the control valve 12 to actuate same.

Figure 13:
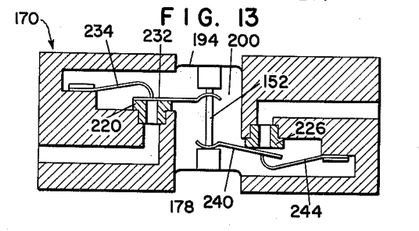

FIG. 13 schematically shows the position of the flapper 232, 240 for a zero control valve output fluid pressure condition or a condition in which no regulated supply air under pressure is consumed. Under this condition it can be seen that the nozzle 220 which is connected to the regulated fluid pressure supply will be closed and that the air under pressure in the third chamber 200 is exhausted to atmospheric pressure by way of the exhaust flapper nozzle valve 226, 240. Under this direct acting D.A. condition, the pilot valve 170 will not be consuming any air from regulated air supply source referred to supra or applying any of this regulated air pressure to the control valve 12 to actuate same.

When the pilot valve 170, shown in FIG. 13, has been rotated one hundred and eighty degrees, as previously described, to a reverse acting position from that shown in this figure then the flapper nozzle 226, 240 which is then connected to the regulated fluid pressure supply will be open and the full fluid pressure output condition will be present. Under this condition, no regulated supply of air under pressure is consumed nor bled to atmospheric pressure through the then exhaust nozzle 220 when the pilot valve 170 has been placed in its reverse acting position.

From the aforementioned description, it can be seen that the positioning apparatus disclosed herein provides different abnormally wide ranges of stroke by incorporating a cam in the feedback structure which will cause a follower associated therewith to always travel in one direction or another along either one or the other of two common peripheral lengths of the cam when the cam is placed in any one of four different operating positions, thereby, enabling a stroke of an actuator connected to the positioner to be readily selected which will lie within one or another of two closely associated or widely separated stroke length ranges.

It can also be seen from the aforementioned description that not only does the positioner provide any one of a number of selected strokes for an actuator that can be in any two closely or widely separated ranges, but also comprises a single pilot valve for a direct acting or reverse acting positioner control which valve has a supply and atmospheric exhaust flapper nozzle valve whose overlap can be adjusted to provide a high degree of sensitivity or a low dead band, good reproducibility and at the same time is structurally arranged so that it will require an abnormally small amount of air from a regulated fluid pressure supply source to make it operable.

What is claimed is:

1. A pilot valve for a positioning apparatus having a connecting rod operably connected at one end to receive motion from a movable controlled member by means of a feedback linkage and being operably connected for movement at its other end in accordance with changes occurring within the magnitude of a measured variable condition, said improvement comprising a chamber surrounding said rod and having adjustable regulated fluid pressure supply and bleed valves positioned therein, the supply and bleed valve each having a movable member positioned within the chamber, both of said valve members being jointly operable by the movement of the connecting rod, said movable member of the supply valve being positioned by the movement of the rod in one direction toward an open supply valve position while the movable member of the bleed valve simultaneously moves the bleed valve toward a closed position, and means for applying the fluid pressure in the chamber against the movable controlled member to actuate the member to a position commensurate with the magnitude of the fluid pressure of the fluid in said chamber.

2. The pilot valve as specified in claim 1 wherein the casing has passageways associated therewith to accommodate the movement of the casing to a second position wherein a preselected regulated fluid pressure supply is applied through said bleed valve into said chamber and a preselected regulated exhaust of the fluid under pressure in the first chamber can simultaneously take place through the supply valve.

3. A positioning apparatus, comprising a pilot valve having three chambers, a first passageway in a side wall of a first one of the chambers for applying a fluid pressure therein that varies in accordance with the magnitude of a variable, a second passageway in a side wall of a second one of the chambers for applying atmospheric pressure therein, separate regulatable fluid supply and atmospheric bleed valve positioned in the third chamber connected for joint movement with one another, a passageway extending from the third chamber for applying the fluid presure therein to a fluid pressure actuated member, first and second flexible members extending respectively between side wall portions of the chambers to form a common wall between the first and second chambers, and a common wall between the second and third chambers, a third flexible member extending between another side wall portion of the third chamber, a connecting rod extending between and fixedly connected to central portions of the three flexible members and a movable part of the separate fluid supply valve and the bleed valve, a change in the magnitude of the fluid pressure in the first chamber in one direction being effective to move the rod in a first direction and the movable part of the fluid supply valve toward a fully closed position while the movable part of the atmospheric bleed valve is simultaneously moved to a fully open position and wherein a change in the magnitude of the fluid pressure in the first chamber in an opposite direction is effective to move the rod in a second opposite direction and the fluid supply valve toward a fully open position, while the atmospheric bleed valve is simultaneously being moved to a fully closed position, and a mechanically actuated feedback connection positioned for movement between the fluid pressure actuated member and the third flexible member.

4. The positioning apparatus as defined by claim 3 wherein the first of the flexible wall members that are respectively in contact with the fluid pressure in the first chamber and the atmospheric pressure in the second chamber is of a preselected area and the areas of the second and third flexible wall members are of substantially the same area but of a smaller area than said first flexible member.

5. A positioning apparatus, comprising a pilot valve having three chambers, a first passageway in a side wall of a first one of the chambers for applying a fluid pressure therein that varies in accordance with the magnitude of a variable, a second passageway in a side wall of a second one of the chambers for applying atmospheric pressure therein, a separate regulatable flapper nozzle fluid supply valve and a separate flapper nozzle atmospheric bleed valve, each of said last two mentioned valves having a passageway of substantially uniform diameter therein positioned in the third chamber, a passageway extending from the third chamber for applying the fluid pressure therein to a fluid pressure actuated member, first and second flexible members extending respectively between said wall portions of the chambers to form a common wall between the first and second chamber and a common wall between the second and third chamber, a third flexible member extending between another side wall portion of the third chamber, a connecting rod extending between and fixedly connected to central portions of the three flexible members and a movable part of the separate fluid supply valve and the bleed valve, a change in the magnitude of the fluid pressure in the first chamber in one direction being effective to move the rod in a first direction and the movable part of the flapper of the fluid supply valve toward a fully closed nozzle position while the flapper of the movable part of the bleed valve simultaneously moves said last-mentioned valve to a fully open position and wherein a change in the magnitude of the fluid pressure in the first chamber in an opposite direction is effective to move the rod in a second opposite direction and the flapper of the fluid supply valve toward a fully open nozzle position, while the flapper of the bleed valve is simultaneously being moved to a fully closed nozzle position, and a mechanically actuated feedback connection positioned for movement between the fluid pressure actuated member and the third flexible member.

6. The positioning apparatus defined by claim 5 wherein threaded connections are employed on the connecting rod for adjusting the position of the flappers with respect to the open end of their associated nozzles.

7. The positioning apparatus defined by claim 5 wherein a pivot connection is formed between the end of each flapper of the separate flapper nozzle valves and its associated rod connection to thereby effect cut off of the fluid pressure supply to and from the third chamber and to the fluid pressure actuated member during a condition in which a zero or full output pressure is applied by way of the third chamber and passageway associated therewith to the fluid pressure actuating member.

8. The positioning apparatus defined by claim 5 wherein an adjustable pivot connection is formed between and end of each flapper of the separate flapper nozzle valves and its associated rod connection for maintaining each of the two flappers in preselected partially open positions to thereby afford economical and rapid adjustment of the magnitude of the fluid pressure in the third chamber to a preselected level during a condition in which the positioning apparatus is in any one of a number of pressure balance positions.

9. The positioning apparatus defined by claim 5 wherein the ends of the side walls of the three chambers are fixedly retained as a single unit in contact with one another by means of a first connecting means, a stationary support housing, a removable connecting means extending between the three chamber units and the housing for rotating and fixedly positioning the unit thereon in one or the other of two fixed angularly displaced direct-acting or reverse-acting positions, the stationary support housing and the side walls of the unit being provided with passageways to apply a regulated fluid supply pressure to the fluid supply nozzle and an atmospheric pressure bleed for the bleed nozzle when the unit is mounted on the housing in a first one of its positions, the passageways to the nozzle in the housing and the side walls of the unit being positioned to connect the regulated fluid supply pressure to the previously-mentioned exhaust nozzle and to simultaneously connect the previously-mentioned supply nozzle to atmospheric pressure when the unit is moved to a second one of its positions.

10. The positioning apparatus defined by claim 5 wherein the ends of the side walls of the three chambers are fixedly retained as a single unit in contact with one another by means of a first connecting means, a stationary support housing, a removable connecting means extending between the three chamber units and the housing for rotating and fixedly positioning the unit thereon in one or the other of two fixed angularly displaced direct-acting or reverse-acting positions, the stationary support housing and the side walls of the unit being provided with passageways to supply a regulated fluid supply pressure to the fluid supply nozzle and an atmospheric pressure bleed for the bleed nozzle when the unit is mounted on the housing in a first one of its positions, and the passageways to the nozzle in the housing and the side walls of the unit being positioned to connect the regulated fluid supply pressure to the previously-mentioned exhaust nozzle and to simultaneously connect the previously-mentioned supply nozzle to atmospheric pressure when the unit is moved to a second one of its positions, and an additional two passageways in the chamber unit, one of which is positioned to connect the first chamber with a single passageway in the housing to apply a fluid pressure thereto in accordance with the magnitude of a variable when the unit is placed in one of its positions and the other passageway being positioned to connect the first chamber with the housing when the unit is placed in the other of its two positions.

11. The positioning apparatus as defined by claim 5 wherein the mechanical feedback connection is comprised of a cam having two differently-shaped, curved surfaces, which are adapted to be mounted in any one of four different positions, a spring bias follower in contact with the cam, and wherein the mounting of the cam in two of its four positions enables the pilot valve to transmit any stroke of a predetermined length which lies within one or another series of stroke lengths to the actuated member and wherein the mounting of the cam in the other two remaining positions enables the pilot valve to transmit any stroke of a predetermined length which lies within said previous series of stroke lengths to the actuated member.

12. A pneumatic positioning apparatus, comprising a pilot having three chambers, a first passageway in a side wall of a first one of the chambers for applying an air pressure therein that varies in accordance with the magnitude of a variable, a second passageway in a side wall of a second one of the chambers for applying atmospheric pressure therein, a separate regulatable air supply and atmospheric bleed valve positioned in the third chamber connected for joint movement with one another, a passagewey extending from the third chamber for applying the air pressure therein to an air pressure actuated member, first and second flexible members extending respectively between side wall portions of the chambers to form a common wall between the first and second chamber and a common wall between the second and third chamber, a third flexible member extending between another side wall portion of the third chamber, a connecting rod extending between and fixedly connected to central portions of the three flexible members and a movable part of the separate air supply valve and bleed valve, a change in the magnitude of the air pressure in the first chamber in one direction being effective to move the rod in a first direction and the movable part of the air supply valve toward a fully closed position while the movable part of the atmospheric bleed valve is simultaneously moved to a fully open position and wherein a change in the magnitude of the air pressure in the first chamber in a second opposite direction is effective to move the atmospheric rod in an opposite direction and the air supply valve toward a fully open position, while the bleed valve is simultaneously being moved to a fully closed position, and a mechanically actuated feedback connection positioned for movement between the air pressure actuated member and the third flexible member.

13. A valve positioner, comprising a pilot valve having three chambers, a first passageway in a side wall of a first one of the chambers for applying a fluid pressure therein that varies in accordance with the magnitude of a variable, a second passageway in a side wall of a second one of the chambers for applying atmospheric pressure therein, a separate regulatable fluid supply and atmospheric bleed valve positioned in the third chamber connected for joint movement with one another, a passageway extending from the third chamber for applying the fluid pressure therein to a fluid actuated control valve, and first and second flexible members extending respectively between side wall portions of the chambers to form a common wall between the first and second chamber and a common wall between the second and third chamber, a third flexible member extending between another side wall portion of the third chamber, a connecting rod extending between and fixedly connected to central portions of the three flexible members and a movable part of the separate fluid supply valve and bleed valve, a change in the magnitude of the fluid pressure in the first chamber in one direction and the movable part of the fluid supply valve toward a fully closed position while the movable part of the atmospheric bleed valve is simultaneously moved to a fully open position and wherein a change in the magnitude of the fluid pressure in the first chamber in an opposite direction is effective to move the rod in a second opposite direction and the fluid supply valve toward a fully open position, while the atmospheric bleed valve is simultaneously being moved to a fully closed position and a mechanically actuated feedback connection positioned for movement between the fluid actuated control valve and the third flexible member.

14. An improved valve positioner operably connected for applying a controlled fluid pressure to actuate a control valve, comprising a pilot valve having a hollow, substantially cup-shaped casing, three flexible, spaced-apart members extending between end portions of the casing and forming three chambers therein, the casing having a first passageway therein adapted to apply a first control pressure to a first one of the flexible members forming a first chamber with a closed end wall of the casing, a second passageway in the casing adapted to connect a second chamber formed by the first flexible member and a second of the three flexible members to atmospheric pressure, a third unrestricted passageway in the casing terminating inwardly of the casing in a first nozzle that is adapted to supply a fluid supply pressure signal to a third chamber formed by the second and a third one of the flexible member, the casing having a fourth unrestricted passageway terminating inwardly of the casing, in a second nozzle that is adapted to exhaust a regulated amount of the supply pressure signal from the third chamber, a mechanical feedback connection fixedly positioned for joint movement with the three flexible members and with the control valve, an independently adjustable first spring bias flapper having one end operably positioned to rotate about an edge of the first nozzle between and away from a fully open and fully closed position and having a second end adjustably connected for preselected amounts of the rotatable motion with one portion of the mechanical feedback connection, a second spring bias flapper having one end operably positioned to rotate about an edge of the second nozzle between and away from a fully open and fully closed position and having a second end adjustably connected for preselected amounts of the rotatable motion with another portion of the mechanical feedback connection.

References Cited by the Examiner
UNITED STATES PATENTS

| | | | |
|---|---|---|---|
| 1,464,589 | 8/23 | Talbot | 74—568 |
| 2,233,319 | 2/41 | Lozivit | 123—119 |
| 2,286,282 | 6/42 | Joesting | 137—636.1 |
| 2,438,202 | 3/48 | Burns | 74—568 |
| 2,588,622 | 3/52 | Eckman | 137—85 |
| 2,724,398 | 11/55 | Higgins | 91—457 |
| 2,725,068 | 11/55 | Howe | 137—82 |
| 2,887,998 | 5/59 | Thorner | 91—387 |
| 2,966,891 | 1/61 | Williams | 91—387 |
| 3,003,475 | 10/61 | Rouvalis | 91—387 |
| 3,065,735 | 11/62 | Chaves | 91—387 |

FRED E. ENGELTHALER, *Primary Examiner.*

SAMUEL LEVINE, *Examiner.*